US010351361B2

(12) United States Patent
Bartholomew et al.

(10) Patent No.: US 10,351,361 B2
(45) Date of Patent: Jul. 16, 2019

(54) SHIP LOADING SYSTEM (71) Applicants: FLSmidth A/S, Valby (DK); Louis DiBuo, New Ringgold, PA (US)

(72) Inventors: Leslie Bartholomew, Bethlehem, PA (US); David Bergenstock, Coopersburg, PA (US); Louis DiBuo, New Ringgold, PA (US); Joseph Novicki, Schnecksville, PA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 15/571,973

(22) PCT Filed: Jul. 16, 2015

(86) PCT No.: PCT/US2015/040742
§ 371 (c)(1),
(2) Date: Nov. 6, 2017

(87) PCT Pub. No.: WO2017/011017
PCT Pub. Date: Jan. 19, 2017

(65) Prior Publication Data
US 2018/0141764 A1 May 24, 2018

(51) Int. Cl.
*B65G 63/00* (2006.01)
*B65G 67/60* (2006.01)
*B65G 53/04* (2006.01)
*B65G 53/20* (2006.01)

(52) U.S. Cl.
CPC ......... *B65G 63/008* (2013.01); *B65G 67/606* (2013.01); *B65G 53/04* (2013.01); *B65G 53/20* (2013.01)

(58) Field of Classification Search
CPC .... B65G 63/008; B65G 67/606; B65G 53/20; B65G 53/04
USPC ....................................... 414/140.9
See application file for complete search history.

(56) References Cited

U.S. PATENT DOCUMENTS

| | | | | |
|---|---|---|---|---|
| 3,114,392 A | * | 12/1963 | Harper | B61C 17/02 137/343 |
| 3,253,865 A | * | 5/1966 | Kanics | B65G 53/20 406/128 |
| 3,268,264 A | * | 8/1966 | Squires | B65G 53/20 406/89 |
| 3,599,722 A | * | 8/1971 | Davidson | A62C 27/00 169/24 |
| 3,774,972 A | * | 11/1973 | Grapengiesser | B65G 53/20 285/331 |
| 4,773,796 A | * | 9/1988 | Strehlow | B65G 53/20 406/138 |
| 5,465,830 A | | 11/1995 | Tingskog | |
| 6,132,156 A | | 10/2000 | Shehata | |
| 6,390,006 B1 | | 5/2002 | Sridhar | |

(Continued)

FOREIGN PATENT DOCUMENTS

WO 1998028210 A1 7/1998

*Primary Examiner* — Lynn E Schwenning
(74) *Attorney, Agent, or Firm* — Jeffrey A. Sharp (57) ABSTRACT

A ship loading system for loading fluidizable materials into a ship's hold is described. The system comprises a self-supporting tubular boom that is attached to a support tower at a single attachment point. An air gravity conveyor is enclosed within the tubular boom for materials from the vicinity of the support tower to the ship's hold.

9 Claims, 5 Drawing Sheets (56) References Cited

U.S. PATENT DOCUMENTS

2014/0270998 A1\* 9/2014 Johnson ................ B65G 53/20
406/194

\* cited by examiner

SECTION E-E
FIG.3a

SECTION F-F
FIG.3b

SECTION B-B
FIG.4a

SECTION C-C
FIG.4b

FIGURE 5

SHIP LOADING SYSTEM

FIELD OF THE INVENTION

The invention relates to a ship loading system comprising an air-assisted gravity conveyor in combination with a specially designed boom.

BACKGROUND OF THE INVENTION

An air-assisted gravity conveyor is a steel rectangular duct that is divided horizontally into two sections by a porous membrane. The area below the membrane is an air plenum and the area above the membrane is a material plenum. In practice the porous membrane allows low pressure air to flow from the air plenum, through the membrane and into the material to be conveyed. The air serves to essential fluidize the material being conveyed to thereby facilitate the material's movement. The conveyor is installed at a slight downward slope to allow gravity to do much of the work of conveying the material. An example of such a conveyor is FLSmidth's Airslide® gravity conveyor.

Air gravity conveyors are notable for achieving high transport rates combined with low energy consumption when conveying moderately fine particulate solids on a continuous downward slope. As such, it is known that air-gravity conveyors are utilized in a large ship loading procedure, which requires high material loading rates, typically 500 to 2,000 metric tons/hour to load dry, free flowing materials that fluidize well when air (or similar gas) is introduced to the material.

More specifically, materials that are advantageously loaded into a ship's hold utilizing an air gravity conveying means include products of small particle size and/or low density such as cement powder, barite, bentonite, diatomaceous earth, fly ash, talc, starch, flour, copper concentrate, and alumina, to name a few. The conveyors will extend from the dock to an area above a ship's hold, and will load such materials into a ship's hold from distances of 45 meters or more from the support tower. In such a process the air-gravity conveyor will have a closed top to reduce dust and to isolate the material being loaded from the elements, with the air-gravity conveyor having the shape of a rectangular box.

However, present ship loading systems that utilize an air gravity conveyor have disadvantages. At such high loading rates the air gravity conveyor, including its loading spout, is very heavy. Furthermore, an upset condition such as a plugged loading spout or conveyor section may cause the entire vertical spout conduit and horizontal conveyors to fill completely with the material being loaded. In order to support the air gravity conveyor as it extends into space from the support tower to above a ship's hold, it is necessary to employ bulky and costly truss work, designed with a large safety factor to accommodate a worst case load that may be present during an upset condition. Such truss work is expensive because it requires large amounts of steel in order to bear the heavy load of the conveyor while in operation. In addition, the truss work adds considerable height requirements to the support tower.

It is an object of this inventor, therefore, to develop a ship loading system that utilizes an air gravity conveyor that does not have the above specified disadvantages.

SUMMARY OF THE INVENTION

In accordance with the instant invention, there is described a ship loading system in which an air gravity conveyor having a closed top is disposed within a self-supporting boom which in turn is comprised of cantilevered, hollow tubular sections that extend from a support tower to the vicinity of a ship's hold, and which only have a single attachment point to the support tower. Material will therefore be conveyed from a silo, unloading truck, railcar or the like to the ship loading system of the present invention and thereafter to the ship's hold. This system of deploying an air gravity conveyor within a tubular, self-supporting boom significantly reduces capital equipment expenditures compared to prior art ship loading systems.

DESCRIPTION OF THE DRAWINGS

The invention is now described in more detail with reference to the accompanying drawings, in which.

DETAILED DESCRIPTION OF THE INVENTION

Figure 1:
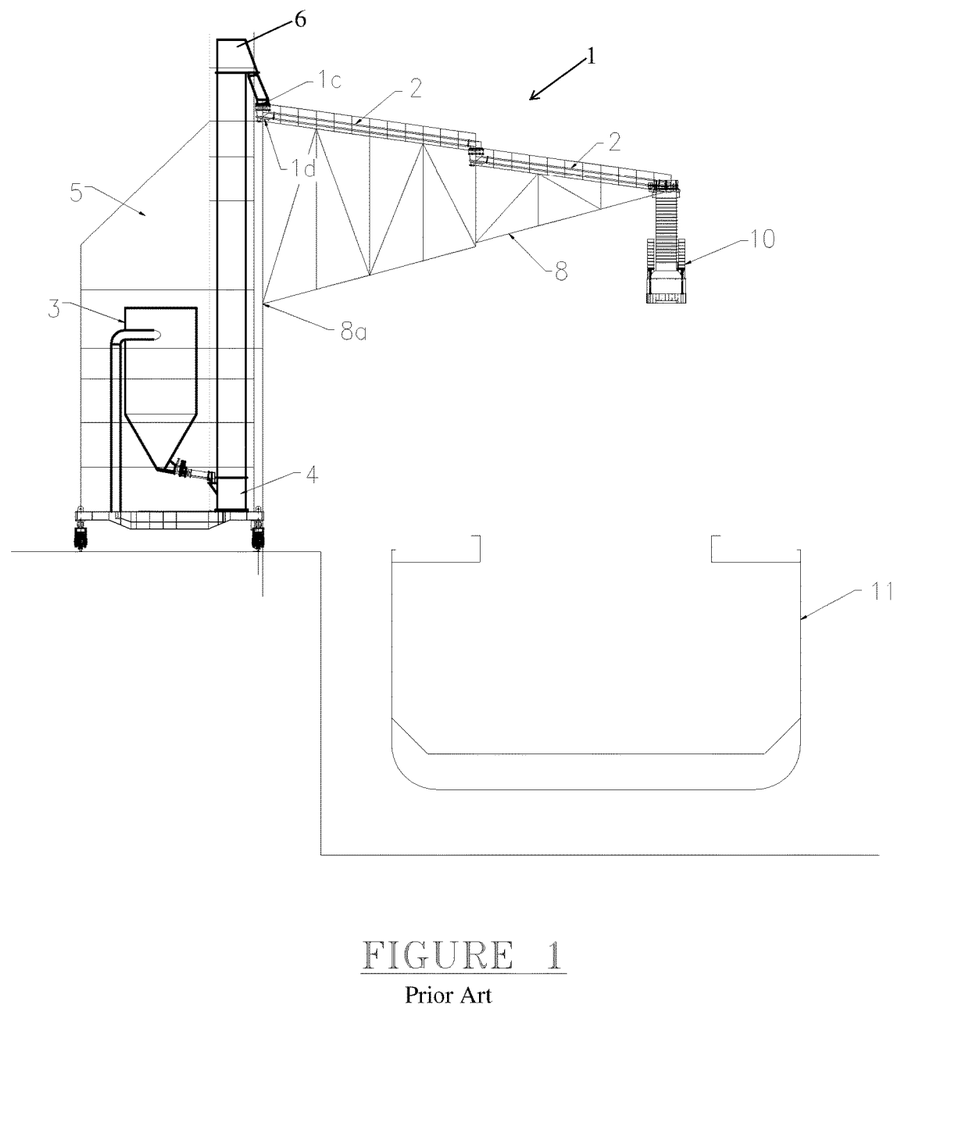
FIG. 1 is an elevation view of a prior art ship loading device showing an air gravity conveyor supported by truss work.

FIG. 1 illustrates a prior art ship loading boom 1 in which an air gravity conveyor 2 is utilized. The air gravity conveyor as depicted rests on a supporting platform on loading boom 1 and is otherwise open to the environment. Fluidizable material, such as cement, is directed from a dockside storage means (not depicted), such as a silo, railcar, truck or the like to a conveyor, such as a screw conveyor, air gravity conveyor or a drag conveyor to move the material dockside. The material is placed in a hopper 3 or similar containment device located dockside and then raised to the elevation of the loading boom 1 via a lifting mechanism 4, such as a bucket elevator (depicted), pneumatic conveyor, screw conveyor or belt conveyor. The lifting mechanism 4 is attached to a support tower 5 located adjacent to a dock, which as depicted is a movable support tower although, alternatively, a fixed support tower can be utilized.

The material is transferred from the vertical conveyor discharge device 6 to the material receiving end of an air gravity conveyor 2 which rests on loading boom 1. As depicted, boom 1 has two sections, although only one boom section may be utilized. Boom 1 extends away from the support tower into the area of the dock, and is supported by and attached to the support tower 5 at two attachment points 1c and 1d. Boom 1 is not self-supporting, and therefore needs to be further supported and secured by a truss 8, which in turn is attached to the support tower at connection point 8a.

The material exits the air gravity conveyor 2 into a vertically extending/telescoping bellows/feeding spout 10 from which the material is directed into the ship's open hold 11. The spout is telescoped directly into the ship's hold and releases the material at very short distances from the top of a material pile. As the pile grows upwardly, the spout is retracted vertically upward.

Dust is generated in the hold during the material loading process. Such dust is entrained in air which in turn is drawn upward through a vertically extending annulus in the interior of the bellows which circles and is separated from the path that material takes downward through the bellows. From the bellows the gas and entrained dust is directed up through and out of the bellows 10 and into an external duct (not shown) and thereafter to a dust collector (not shown) which is mounted on support tower 5. Dust separated from the air in the dust collector is returned to air gravity conveyor 2.

Not shown are accessory equipment that will be on or in the vicinity of the boom such as such as but not necessarily limited to fluidizing and ventilation fans, motor(s) for the bellows, dust collectors, electrical systems and controls, computerized or otherwise.

The extensive supporting truss structure utilized to enable a prior art boom to support the extreme weights that are associated with a ship loading procedure has a consequence on the height requirements for both the support tower and the vertical conveyor and the weight of the loading spout/bellows.

The present invention presents a new boom design that is self-supporting, which for the purposes of this description and the attached claims means that an accompanying support truss or any other underlying means of support is not required. The boom therefore by itself bears the significant weights associated with ship loading fluidizable materials.

According to the present invention the prior art boom and its supporting truss structure which is used with an air gravity conveyor are both replaced by a boom in the form of an enclosed hollow tube into which the air gravity conveyor is completely situated and which further is self-supporting and only has a single point of attachment to the support tower.

In addition, the tubular boom design permits accessory equipment to the air gravity conveyor such as dust removal ducts, fans and motors to be placed inside the boom and out of the elements, and further allows maintenance work on the gravity conveyor to be performed in an interior environment.

Figure 2:
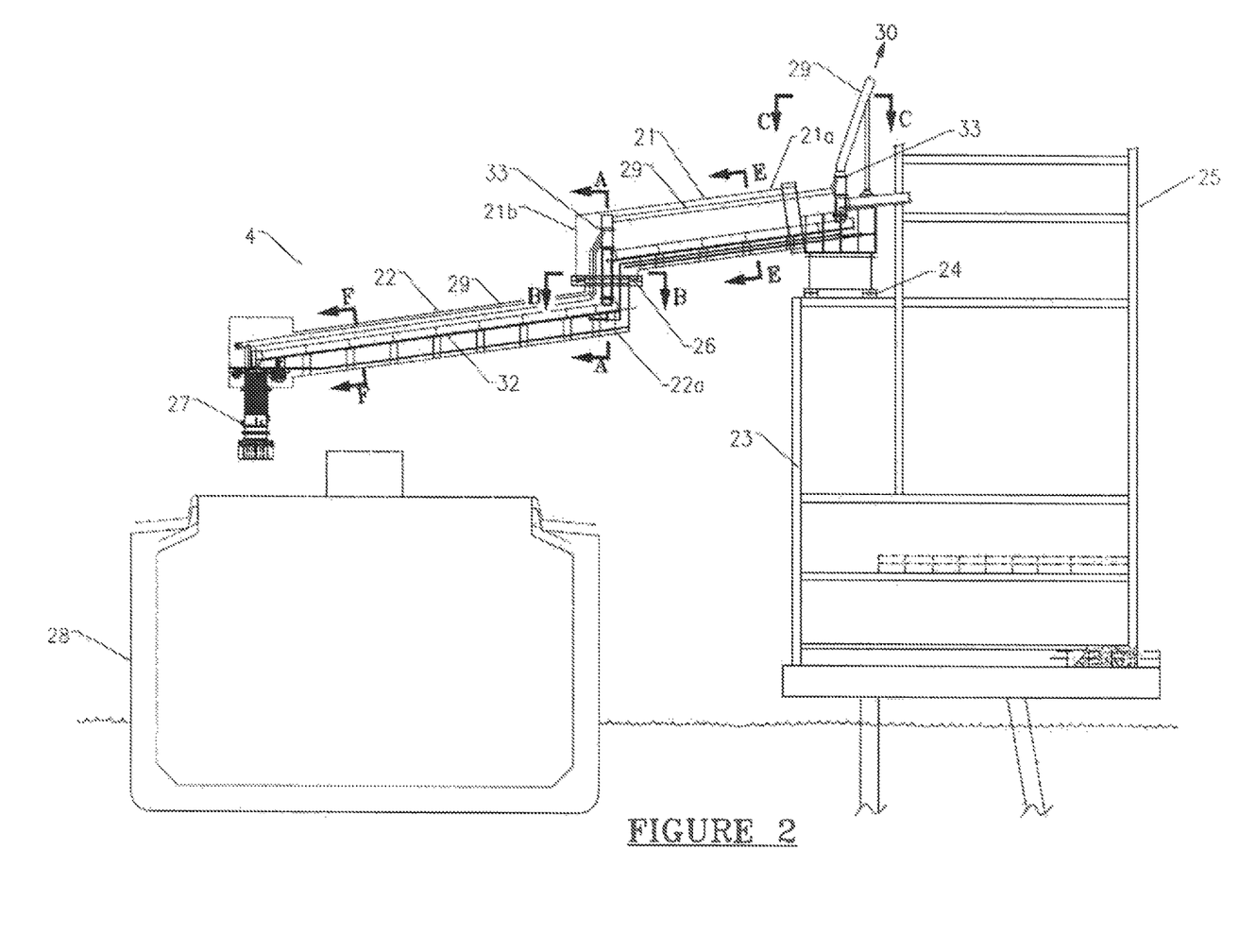
FIG. 2 is a cross sectional elevation view of one embodiment of the ship loading device of the present invention.

FIG. 2 illustrates one embodiment of the ship loading system of the present invention.

The ship loading system of the present invention comprises tubular boom 20, which in the embodiment depicted in FIG. 2 comprises two tubular sections, upper boom section 21 and lower boom section 22. The sections of the tubular boom of the present invention can have differing lengths and diameters, which is the configuration as depicted, with upper boom section 21 having a larger diameter than the lower boom section 22. This is the preferred arrangement to optimize the stability of the boom structure, since the most weight on the boom will be in the area closest to support tower 25. Therefore, the boom section that is, closest to, i.e attached to, the support tower will bear more weight than sections that are further removed from the support tower. When there are two or more sections each succeeding section, relative to the support tower, should preferably have a smaller diameter than the immediately preceding section.

The boom sections 21 and 22 are arranged with a slight downward slope to facilitate the operation of the air gravity conveyor. By fluidizing the material within the air gravity conveyor, the slope angle can be much less than the angle of repose of the material is conveyed.

Tower 25 has affixed thereto pedestal base support 23. Upper boom 21 is connected to the support tower at a single point of attachment that is connected at pedestal base support 23 by a large rotatable swivel support bearing 24, which can be a ball or roller bearing unit, at a location adjacent to the inner end 21a of boom 21. Support bearing 24 permits upper boom section 21 to be pivoted essentially 360° around a vertical axis, although the actual degree of rotation for a given installation will be dependent on the relative position of the boom to external structures such as ladders, the support tower etc. It is an advantage of the present design that the boom structure is supported at this single point of attachment, without the need for any additional support beams, cables, wires, etc. Having a single attachment point, i.e. a single support bearing, eliminates the additional concerns of insuring that, when multiple bearings are employed, they are balanced with each other and rotate in sync.

The boom of the present invention can consist of one or more boom sections. In the case of there being more than one boom section, adjacent sections will also be attached to each other at just one connection point. For example, in FIG. 2 lower boom 22 is rotatably attached to upper boom 21 at a single connection point, in that the inner end 22a of boom 22 is attached to outer end 21b of boom 21 by rotatable circular support bearing 26. Support bearing 26 permits complete rotation of the lower boom if it is free of interference from external structures. Lower boom 22 is attached, at its outer end, to loading spout 27, from which material exits and falls into the ship's hold 28. A boom having two boom sections is the preferred design to load ships of various size and having one or multiple holds.

Air with entrained dust will be drawn by fans (not shown) upward through loading spout 27 and generally through an annular passage that surrounds and is separate from the pathway through which material falls through the loading spout. The dust laden air will then be drawn into dust return duct 29 which is disposed in the interior of boom 20. Dust return duct 29 extends through the complete lengths of lower boom 22 and upper boom 21 while passing through the open center of support bearing 26. At a point adjacent to inner end 21a dust return duct 29 will exit the boom and extend in direction 30 to a dust collector (not shown).

Each of boom sections 21 and 22 are movable about a vertical axis, typically by a remotely controlled electric or hydraulic-driven gear assembly (not depicted) located adjacent to each support bearing, which as depicted in FIG. 2, are support bearings 24 and 26.

Air gravity conveyor 31 is disposed completely within boom 21 and air gravity conveyor 32 is disposed completely within boom 22. Material exiting air gravity conveyor 31 will enter air gravity conveyor swivel assembly 33, through which material will fall by gravity to thereafter enter air gravity conveyor 32. It is a feature of the boom design of the present invention that air gravity conveyor swivel assembly 33, and consequently any material falling there through, is arranged to pass directly through the interior of support bearing 26. Swivel assembly 33 is rotatable in the same direction as are booms 21 and 22. The swivel assemble is a sealed, vertically situated tube within a circular rotatable support bearing sub-assembly, designed to pass material without restriction and prevent air and dust leakage.

Figure 3A:
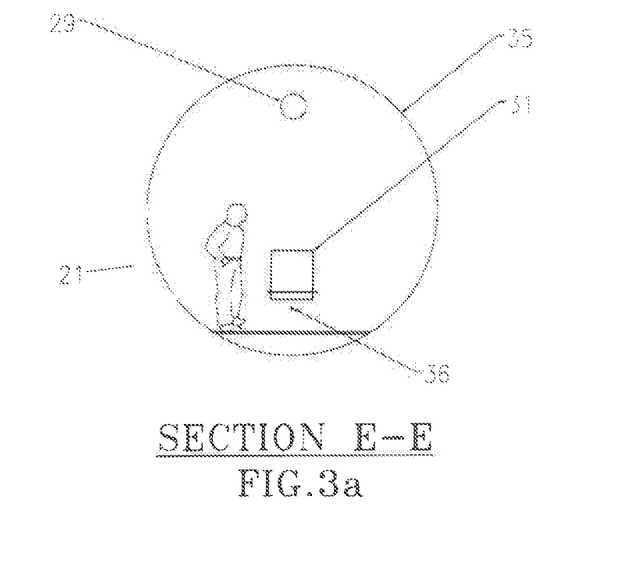
FIG. 3a is a sectional view along line F-F in FIG. 2 of an interior view of a boom section of the present invention.
Figure 3B:
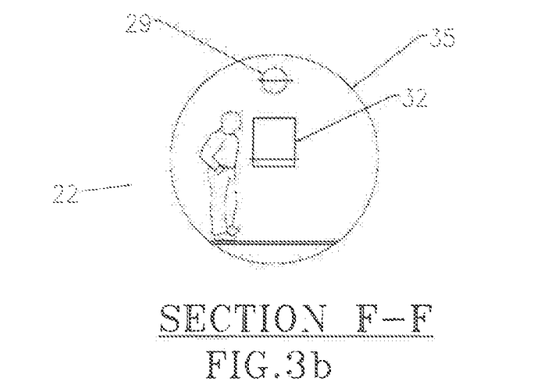
FIG. 3b is a sectional view along line E-E in FIG. 2 of an interior view of a boom section of the present invention.

FIG. 3a is an interior view of upper boom section 21 along line E-E and FIG. 3b is an interior view of lower boom section 22 along line F-F. As depicted, each boom section has a circular cross section with a hollow interior and outer tube surface 35. Air gravity conveyor 31 and 32 are depicted in cross-section and are typically supported by a platform (not shown). Air gravity conveyor 31 has air supply duct 36 positioned beneath the conveyor. Duct 29 extends through the length of boom sections 21 and 22. Not depicted are support structures, i.e. brackets for the ducts and a platform for the air gravity conveyor.

In large ship loading applications the dimensions (width by height) of an air gravity conveyor will typically be approximately 600 mm×600 mm, and the tubular booms should be sized according to such dimensions, the type and loading rate of material and also to accommodate the dust return ducts and auxiliary equipment. In the depicted embodiment boom section 21 is approximately 14' in diameter and boom section 22 is approximately 10' in diameter. Such sizes can also comfortably accommodate an average sized (e.g. approximately 6' tall) person for the purpose of performing ongoing maintenance within the completely enclosed configuration of the boom, even during the loading operation (although of course not while the boom is moving). The enclosed configuration of the boom does not necessitate constructing an access walkway, as required in the prior art boom design, that extends outward from the prior art boom along its entire length to permit inspection and maintenance of the boom. This requirement is not necessary in the present design, as all inspection and maintenance functions are conducted within the boom.

It is an essential feature that the tubular boom completely encloses the air-gravity conveyor. A tubular-like boom structure that does not have a completely enclosed perimeter in its vertical cross section, for example, a semi-circular trough into which a conveyor is situated, will not provide sufficient support for the loads encountered by a ship loading air gravity conveyor.

Preferably, for economy of manufacture, a substantially circular vertical cross section configuration is preferred, which lends itself to being manufactured faster than, for example, rectangular box designs, with far less welding and fabrication work required, resulting in a comparatively low cost support structure.

It is an essential feature of the invention that the vertical cross sectional area of the hollow interior of the tube is of sufficient dimension to accommodate the air gravity conveyor, a maintenance walkway in close proximity to the air gravity conveyor of sufficient width to allow access and maintenance work to be performed, and as so located with sufficient vertical clearance to allow an average size human being to walk in a normal upright position. In addition, the available cross sectional area must allow the fore mentioned dust ventilation conduit, lighting fixtures, preferably located near the upper portion of the interior of the tube and sufficient space for auxiliary equipment, such as electrical conduit, compressed air piping for fluidizing, piping for utility air, instrumentation piping and wiring, etc.

Even with the mentioned auxiliary equipment, the weight of the tubular boom design of the present invention will be significantly less than the weight of a prior art truss design having identical support capabilities. Furthermore, the tubular boom design of the present invention reduces the vertical footprint of the boom, thus permitting a reduction in the height of both the supporting tower and the vertical material conveyor that is attached to the tower, thus resulting in further significant capital savings.

Figure 4A:
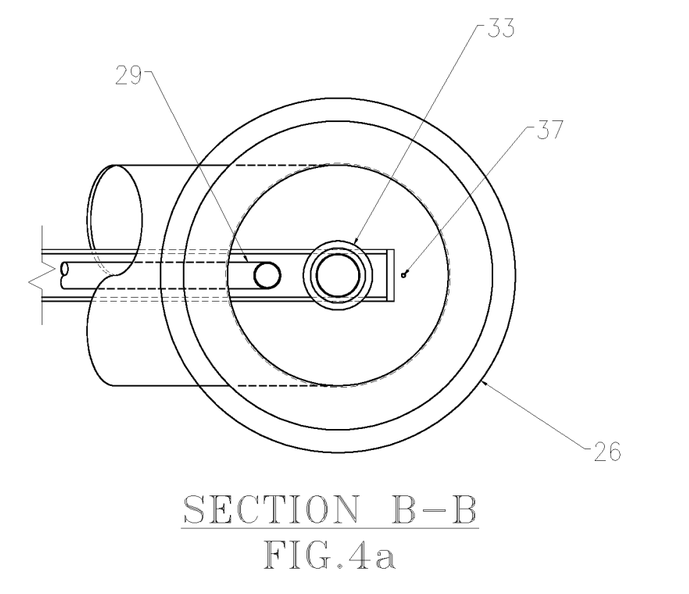
FIG. 4a is a sectional view along line B-B in FIG. 2 providing a view through a rotatable connecting support bearing.
Figure 4B:
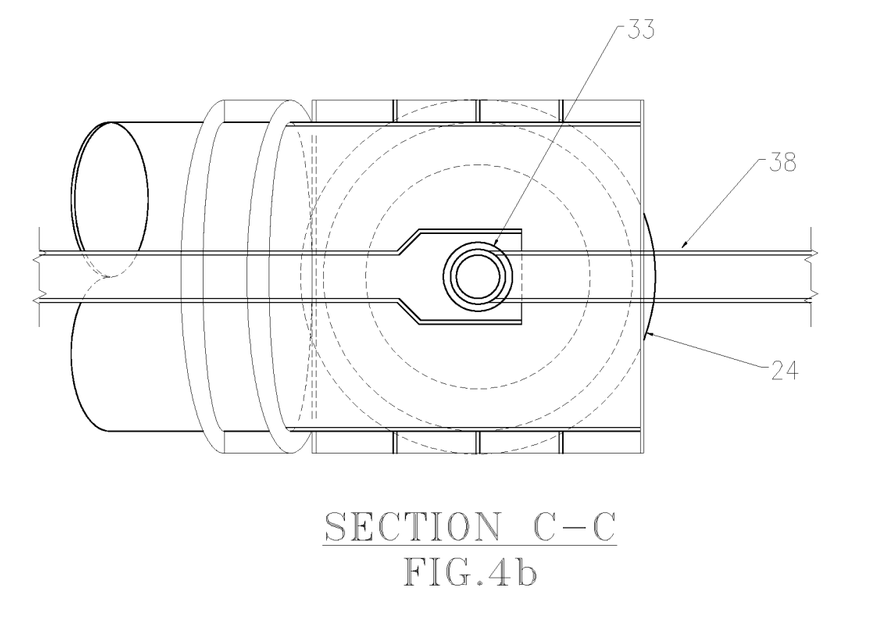
FIG. 4b is a sectional view along line C-C in FIG. 2.

FIG. 4a is a cross section along line B-B in FIG. 2 through bearing 26 that connect the two boom sections 21 and 22 and supports section 22. FIG. 4b is a cross section along line C-C in FIG. 2 through bearing 24. According to FIG. 4a, dust return line 29, swivel assembly 33 and air gravity conveyor air supply line 37 all pass through the center of 26, and consequently the material being conveyed will in turn pass through the center of swivel assembly 33. FIG. 4b also shows swivel assembly 33 passing through the center of support bearing 24. Material is delivered to the boom via conveyor line 38 which, depending on the relative heights of the material source and the boom, may be an air gravity conveyor.

Figure 5:
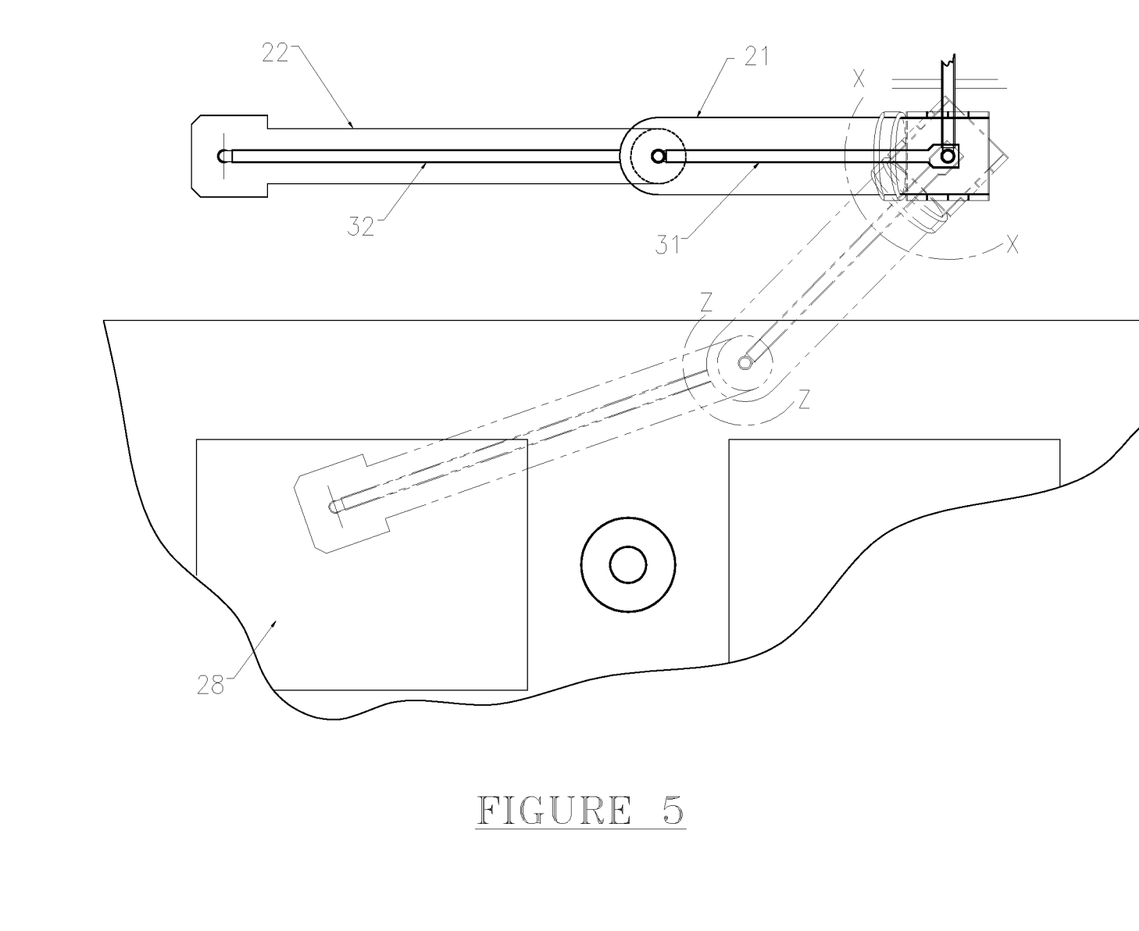
FIG. 5 is a plan view of the boom of the present invention and its rotation in relation to a ship's holds.

FIG. 5 is a plan view showing a boom of the present invention as initially deployed and then extended to reach toward the hold 28 of a ship. Moving the boom to the desired position will involve rotating bearing 24 along path X-X and bearing 26 along path Z-Z to thereby move sections 21 and 22, along with air gravity conveyors 31 and 32, as desired.

As indicated, the present design allows for consideration structural savings over the prior truss designs. Comparative weights between the boom and truss design basically as depicted in FIG. 1 and the design of FIG. 2, are estimated based on the following process parameters:
loading rate of 1,200 MTPH and boom length of 45 meters.
Estimated weigh of boom/truss design of prior art needed to perform under above variables: 280 tons
Estimated weight of boom design of present invention, without having a supporting truss needed to perform under above variables: 165 tons In addition, typically the prior art truss design will require that the support tower's height be at least about 20% higher compared to the height of the support tower when using the boom design of the present invention. Obviously, if the height of the tower is increased, the height of the vertical material conveyor that is supported by the support tower will have to be increased as well, thus further increasing the capital pricing requirements inherent in the prior art design. In addition, the loading/spout bellows used in the prior art design will initially be placed at a higher position above a ship's hold than where the spout will be initially placed in the present invention. Therefore, the prior art spout must extend further to reach the hold, and consequently the telescoping capabilities of the spout utilized with the prior art boom design must be significantly greater than what is requiring utilizing the design of the present invention. This increases the cost and weight of the spout utilized with the prior art design over the spout utilized with the present invention.

The invention claimed is:

1. A ship loading system for loading fluidizable materials into a ship's hold comprising
   a support tower located adjacent to a dock area;
   a tubular boom having an end that is rotatably attached to the support tower whereat the boom is rotatable around a vertical axis, said boom extending from the support tower toward the area above a ship's hold;
   an air gravity conveyor that is completely enclosed within the tubular boom for fluidizing the materials and transporting said materials from the support tower to the ship's hold.

2. A ship loading system for loading fluidizable material into a ship's hold comprising
   a support tower located adjacent to a dock area;
   a tubular boom comprised of two tubular sections which are an upper section and a lower section, with the materials transported from the support tower through the boom and then to the ship's hold, with said upper section having a first end that is rotatably attached to the support tower whereat it is rotatable relative to the support tower around a vertical axis, and wherein there is an air gravity conveyor completely enclosed within the upper tubular boom for fluidizing the materials and transporting said materials from the support tower to the lower section, and a second end that is rotatably attached to the lower section, said lower section being rotatable relative to said upper section around a vertical axis.

3. The ship loading system according to claim 2, further comprising means to entrain in air dust generated by loading the materials into the hold, and to direct such dust entrained air to the support tower through a duct that is located inside the boom.

4. The ship loading system according to claim 2 wherein the boom is sized to permit maintenance or repairs to be conducted inside the boom while material is moving through the boom.

5. The ship loading system according to claim 4 wherein the boom has a circular cross section.

6. The ship loading system according to claim 2 wherein the tubular boom is self-supporting.

7. The ship loading system according to claim 6 wherein the tubular boom is attached to the support tower at a single attachment point.

8. The ship loading system according to claim 2 wherein the second end is attached to the lower section by a rotatable circular attachment bearing having an open center, with the bearing being positioned relative to the upper and lower sections so that material moving from the upper section to the lower section will pass through the center of the bearing.

9. A material conveyor and boom assembly for use in an operation for loading fluidizable materials onto a ship comprising
    a self-supporting tubular boom that is rotatably attached around a vertical axis to a dockside support tower at a single attachment point, said boom extending from the support tower to above a ship's hold; and
    an air gravity conveyor that is completely enclosed within the tubular boom for fluidizing the materials and transporting said materials from the support tower to the ship's hold.

* * * * *